(12) United States Patent
Baskins et al.

(10) Patent No.: US 6,671,694 B2
(45) Date of Patent: Dec. 30, 2003

(54) SYSTEM FOR AND METHOD OF CACHE-EFFICIENT DIGITAL TREE WITH RICH POINTERS

(75) Inventors: Douglas L. Baskins, Fort Collins, CO (US); Alan Silverstein, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 200 days.

(21) Appl. No.: 09/874,788

(22) Filed: Jun. 4, 2001

(65) Prior Publication Data

US 2002/0184231 A1 Dec. 5, 2002

(51) Int. Cl.[7] .............................................. G06F 17/30
(52) U.S. Cl. .................................... 707/102; 707/104.1
(58) Field of Search ........................... 707/3, 5, 6, 100, 707/101, 102, 104.1, 200; 709/102, 103, 245, 252; 370/389, 408, 416

(56) References Cited

U.S. PATENT DOCUMENTS

| | | | |
|---|---|---|---|
| 5,530,957 A | 6/1996 | Koenig | |
| 5,557,786 A | 9/1996 | Johnson, Jr. | |
| 5,701,467 A | * 12/1997 | Freeston | 707/100 |
| 5,829,004 A | * 10/1998 | Au | 707/100 |
| 5,930,805 A | 7/1999 | Marquis | |
| 5,974,411 A | 10/1999 | McCool et al. | |
| 5,987,468 A | 11/1999 | Singh et al. | |
| 6,041,053 A | * 3/2000 | Douceur et al. | 370/389 |
| 6,067,574 A | 5/2000 | Tzeng | |
| 6,470,344 B1 | 10/2002 | Kothuri et al. | |
| 6,505,206 B1 | * 1/2003 | Tikkanen et al. | 707/101 |

OTHER PUBLICATIONS http://www.geocities.com/SiliconValley/4942/arrays.html—Dynamic Array Routines (6 Pages). Printed, Jul. 18, 2001.
Horowitz, Ellis and Sahni Sartaj, "Fundamentals of Data Structure in Pascal," W.H. Freeman and Company, 4th Ed., New York. (1994) 582–595.
Knuth, Donald E., "The Art of Computer Programming," Addison–Wesley Publishing Company. Reading, MA. (1973) 490–493.
Sedgewick, Robert. "Algorithms in C," Addison–Wesley Publishing Company, Reading, MA. (1990) 245–258, 265–271, 373–386.
Acharya, Anurag, Huican Zhu, and Kai Shen. "Adaptive Algorithms for Cache–efficeint Trie Search." University of California, Santa Barbara, CA. 1–11. (No Date).
Bentley, Jon and Robert Sedgewick. "Fast Algorithms for Sorting and Searching Strings." 360–369. (No Date).
Bentley, Jon and Robert Sedgewick. "Ternary Search Trees." Dr. Dobb's Journal. (Apr. 1998) 1–8.
Ai–suwaiyel, M. and Ellis Horowitz. "Algorithms for Trie Compaction." ACM Transactions on Database Systems, vol 9, No. 2. (Jun., 1984) 243–263.
Doeringer, Willibald, Gunter Karjoth and Mahdi Nassehi. "Routing on Longest–Matching Prefixes." IEEE/ACM Transactions on Networking, vol. 4, No. 1. (Feb. 1996). 86–97.

(List continued on next page.)

*Primary Examiner*—Charles Rones

(57) ABSTRACT

An adaptive digital tree data structure incorporates a rich pointer object, the rich pointer including both conventional address redirection information used to traverse the structure and supplementary information used to optimize tree traversal, skip levels, detect errors, and store state information. The structure of the pointer is flexible so that, instead of storing pointer information, data may be stored in the structure of the pointer itself and thereby referenced without requiring further redirection.

22 Claims, 14 Drawing Sheets

OTHER PUBLICATIONS

Reznik, Yuriy, A. "Some results on Tries with Adaptive Branching." 6th Annual International Conference, COCOON (2000) 148–158.

Knott, Gary D. "Fixed–Bucket Binary Storage Trees" Journal of Algorithms 3, (1982) 276–287.

Luccio, Fabrizio, Mirelle Regnier, Rene Schott. "Discs and Other Related Data Structure," Workshop WADS. (Aug. 1989). 192–205.

Clement, J. P. Flajolet, and B. Vallee. "Dynamical Sources in Information Theory: A general Analysis of Trie Structures," Algorithmica. (2001). 307–369.

Merrett, T. H., Heping Shang, and Xiaoyan Zhao. "Database Structures, Based on Tries, for Text, Spatial, and General Data." School of COmputer Science, McGill University. 1–11. (No Date).

Bentley, Jon L. "Multidimensional Binary Search Trees Used for Associative Searching." Association for Computing Machinery, Inc. Vo. 18. No. 9. (Sep. 1975) 509–517.

Jacquet, Philippe and Wojciech Szpankowski. "What we can learn about Suffix Trees from Independent Tries." WADS. (Aug. 1991). 228–239.

Nilsson, Stefan and Matti Tikkanen. "An experimental study of Compression Methods for dynamic Tries." 1–21. (No Date).

Martinez, Conrad, et al. "Partial match queries in relaxed multidimensional search trees." Austrian–Spanish Scientific Exchange Program. (Sep. 28, 1998). 1–24.

Rais, Bonita, et al. "Typical Behavior of Patricia Tries." Allerton Conference on Communications, Control, and Computing. (Oct. 1990). 924–925.

Kirschenhofer, Peter, et al. "Do we really need to Balance Patricia Tries?"National Science Foundation. 302–316.

Procopiuc, Octavian. "Data Structures for Spatial Systems." (May 12, 1997). 1–20.

* cited by examiner

| FIG. 1A | FIG. 1B |
|---------|---------|
| FIG. 1C | FIG. 1D |

FIG. 1

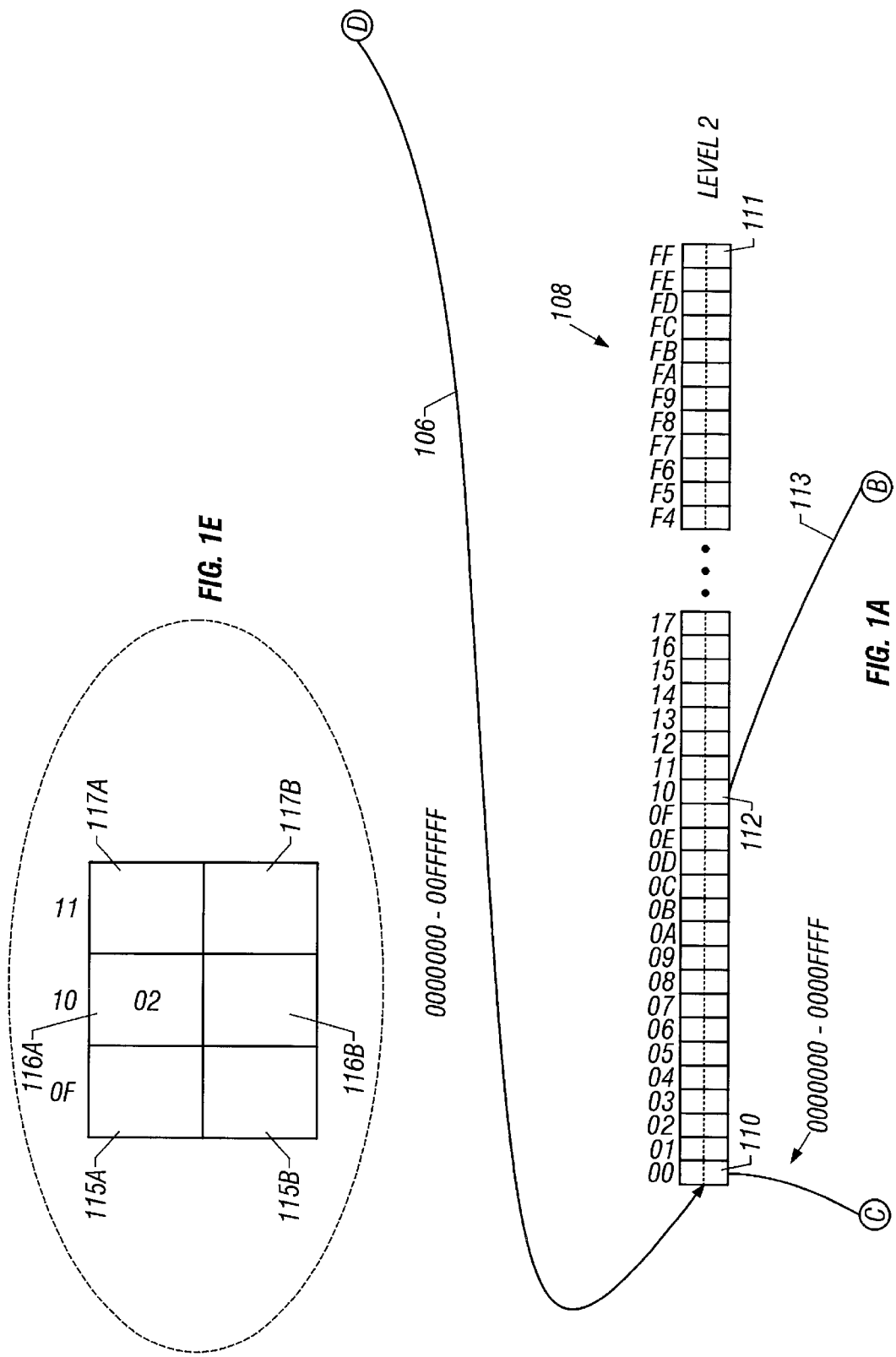

| INDEX-SIZE | [64-BIT] | 32-BIT |
|---|---|---|
| [7-BYTE INDEXES] | [1..2] | |
| [6-BYTE INDEXES] | [1..2] | |
| [5-BYTE INDEXES] | [1..3] | |
| [4-BYTE INDEXES] | [1..3] | |
| 3-BYTE INDEXES | [1..5] | 1..2 |
| 2-BYTE INDEXES | [1..7] | 1..3 |
| 1-BYTE INDEXES | [1..15] | 1..7 |

*FIG. 3*

*FIG. 2* — TYPE = 8 BITS

SYSTEM FOR AND METHOD OF CACHE-EFFICIENT DIGITAL TREE WITH RICH POINTERS

RELATED APPLICATIONS

The present application is related to co-pending, commonly assigned, concurrently filed U.S. patent application Ser. No. 09/874,586 filed Jun. 4, 2001 entitled "SYSTEM AND METHOD OF PROVIDING A CACHE-EFFICIENT, HYBRID, COMPRESSED DIGITAL TREE WITH WIDE DYNAMIC RANGES AND SIMPLE INTERFACE REQUIRING NO CONFIGURATION OR TUNING"; U.S. patent application Ser. No. 09/874,768 filed Jun. 4, 2001 entitled "SYSTEM AND METHOD FOR DATA COMPRESSION IN A *VALUELESS* DIGITAL TREE REPRESENTING A BITSET"; and U.S. patent application Ser. No. 09/874,654 filed Jun. 4, 2001 entitled "SYSTEM FOR AND METHOD OF EFFICIENT, EXPANDABLE STORAGE AND RETRIEVAL OF SMALL DATASETS," the disclosures of which are hereby incorporated herein by reference.

TECHNICAL FIELD

The present invention relates generally to the field of data structures, and more particularly to a hierarchical data organization in which the structure of the data organization is dependent on the data stored and information is associated with pointers.

BACKGROUND

Computer processors and associated memory components continue to increase in speed. As hardware approaches physical speed limitations, however, other methods for generating appreciable decreases in data access times are required. Even when such limitations are not a factor, maximizing software efficiency maximizes the efficiency of the hardware platform, extending the capabilities of the hardware/software system as a whole. One method of increasing system efficiency is by providing effective data management, achieved by the appropriate choice of data structure and related storage and retrieval algorithms. For example, various prior art data structures and related storage and retrieval algorithms have been developed for data management including arrays, hashing, binary trees, AVL trees (height-balanced binary trees), b-trees, and skiplists. In each of these prior art data structures, and related storage and retrieval algorithms, an inherent trade-off has existed between providing faster access times and providing lower memory overhead. For example, an array allows for fast indexing through the calculation of the address of a single array element but requires the pre-allocation of the entire array in memory before a single value is stored, and unused intervals of the array waste memory resources. Alternatively, binary trees, AVL trees, b-trees and skiplists do not require the pre-allocation of memory for the data structure and attempt to minimize allocation of unused memory but exhibit an access time which increases as the population increases.

An array is a prior art data structure that has a simplified structure and allows for rapid access of the stored data. However, memory must be allocated for the entire array and the structure is inflexible. An array value is looked up "positionally," or "digitally," by multiplying the index by the size (e.g., number of bytes) allocated to each element of the array and adding the offset of the base address of the array. Typically, a single Central Processing Unit (CPU) cache line fill is required to access the array element and value stored therein. As described and typically implemented, the array is memory inefficient and relatively inflexible. Access, however, is provided as O(1), i.e., independent of the size of the array (ignoring disk swapping).

Alternatively, other data structures previously mentioned including binary trees, b-trees, skiplists and hash tables, are available which are more memory efficient but include undesirable features. For example, hashing is used to convert sparse, possibly multi-word indexes (such as strings) into array indexes. The typical hash table is a fixed-size array, and each index into it is the result of a hashing algorithm performed on the original index. However, in order for hashing to be efficient, the hash algorithm must be matched to the indexes which are to be stored. Hash tables also require every data node to contain a copy of (or a pointer to) the original index (key) so you can distinguish nodes in each synonym chain (or other type of list). Like an array, use of hashing requires some preallocation of memory, but it is normally a fraction of the memory that must be allocated for a flat array, if well designed i.e., the characteristics of the data to be stored are well known, behaved and matched to the hashing algorithm, collision resolution technique and storage structure implemented.

In particular, digital trees, or tries, provide rapid access to data, but are generally memory inefficient. Memory efficiency may be enhanced for handling sparse index sets by keeping tree branches narrow, resulting in a deeper tree and an increase in the average number of memory references, indirections, and cache line fills, all resulting in slower access to data. This latter factor, i.e., maximizing cache efficiency, is often ignored when such structures are discussed yet may be a dominant factor affecting system performance. A trie is a tree of smaller arrays, or branches, where each branch decodes one or more bits of the index. Prior art digital trees have branch nodes that are arrays of simple pointers or addresses. Typically, the size of the pointers or addresses are minimized to improve the memory efficiency of the digital tree.

At the "bottom" of the digital tree, the last branch decodes the last bits of the index, and the element points to some storage specific to the index. The "leaves" of the tree are these memory chunks for specific indexes, which have application-specific structures.

Digital trees have many advantages including not requiring memory to be allocated to branches which have no indexes or zero population (also called an empty subexpanse). In this case the pointer which points to the empty subexpanse is given a unique value and is called a null pointer indicating that it does not represent a valid address value. Additionally, the indexes which are stored in a digital tree are accessible in sorted order which allows identification of neighbors. An "expanse" of a digital tree as used herein is the range of values which could be stored within the digital tree, while the population of the digital tree is the set of values that are actually stored within the tree. Similarly, the expanse of a branch of a digital tree is the range of indexes which could be stored within the branch, and the population of a branch is the number of values (e.g., count) which are actually stored within the branch. (As used herein, the term "population" refers to either the set of indexes or the count of those indexes, the meaning of the term being apparent to those skilled in the art from the context in which the term is used.)

"Adaptive Algorithms for Cache-Efficient Trie Search" by Acharya, Zhu and Shen (1999), the disclosure of which is hereby incorporated herein by reference, describes cache-efficient algorithms for trie search. Each of the algorithms use different data structures, including a partitioned-array, B-tree, hashtable, and vectors, to represent different nodes in a trie. The data structure selected depends on cache characteristics as well as the fanout of the node. The algorithms further adapt to changes in the fanout at a node by dynamically switching the data structure used to represent the node. Finally, the size and the layout of individual data structures is determined based on the size of the symbols in the alphabet as well as characteristics of the cache(s). The publication further includes an evaluation of the performance of the algorithms on real and simulated memory hierarchies.

Other publications known and available to those skilled in the art describing data structures include *Fundamentals of Data Structures in Pascal*, 4th Edition; Horowitz and Sahni; pp 582–594; *The Art of Computer Programming*, Volume 3; Knuth; pp 490–492; Algorithms in C; Sedgewick; pp 245–256, 265–271; "Fast Algorithms for Sorting and Searching Strings"; Bentley, Sedgewick; "Ternary Search Trees"; 5871926, INSPEC Abstract Number: C9805-6120-003; Dr Dobb's Journal; "Algorithms for Trie Compaction", ACM Transactions on Database Systems, 9(2):243-63, 1984; "Routing on longest-matching prefixes"; 5217324, INSPEC Abstract Number: B9605-6150M-005, C9605-5640-006; "Some results on tries with adaptive branching"; 6845525, INSPEC Abstract Number: C2001-03-6120-024; "Fixed-bucket binary storage trees"; 01998027, INSPEC Abstract Number: C83009879; "DISCS and other related data structures"; 03730613, INSPEC Abstract Number: C90064501; and "Dynamical sources in information theory: a general analysis of trie structures"; 6841374, INSPEC Abstract Number: B2001-03-6110-014, C2001-03-6120-023, the disclosures of which are hereby incorporated herein by reference.

An enhanced storage structure is described in U.S. patent application Ser. No. 09/457,164 filed Dec. 8, 1999, currently pending, entitled "A FAST EFFICIENT ADAPTIVE, HYBRID TREE," (the '164 application) assigned in common with the instant application and hereby incorporated herein by reference in its entirety. The data structure and storage methods described therein provide a self-adapting structure which self-tunes and configures "expanse" based storage nodes to minimize storage requirements and provide efficient, scalable data storage, search and retrieval capabilities. The structure described therein, however, does not take full advantage of certain sparse data situations.

An enhancement to the storage structure described in the '164 application is detailed in U.S. patent application Ser. No. 09/725,373, filed Nov. 29, 2000, currently pending, entitled "A DATA STRUCTURE AND STORAGE AND RETRIEVAL METHOD SUPPORTING ORDINALITY BASED SEARCHING AND DATA RETRIEVAL", assigned in common with the instant application and hereby incorporated herein by reference in its entirety. This latter application describes a data structure and related data storage and retrieval method which rapidly provides a count of elements stored or referenced by a hierarchical structure of ordered elements (e.g., a tree), access to elements based on their ordinal value in the structure, and identification of the ordinality of elements. In an ordered tree implementation of the structure, a count of indexes present in each subtree is stored, i.e., the cardinality of each subtree is stored either at or associated with a higher level node pointing to that subtree or at or associated with the head node of the subtree. In addition to data structure specific requirements (e.g., creation of a new node, reassignment of pointers, balancing, etc.) data insertion and deletion includes steps of updating affected counts. Again, however, the structure fails to take full advantage of certain sparse data situations.

Accordingly, a need exists for techniques and tools to optimize performance characteristics of digital tree and similar structures.

SUMMARY OF THE INVENTION

The system includes a data structure which is stored in the memory, can be treated as a dynamic array, and is accessed through a root pointer. For an empty tree, this root pointer is null, otherwise it points to the first of a hierarchy of branch nodes. Each branch node consists of a plurality of informational or "rich" pointers which subdivide the expanse of the index (key) used to access the data structure. Each rich pointer contains auxiliary information in addition to, or in some cases instead of, the address of (that is, the pointer to) a subsidiary (child) branch or leaf node. This auxiliary information permits various optimizations that result in a positive "return on investment" despite the space required to store the information.

An informational pointer may contain an address (the actual pointer to a child branch or leaf node); index digits (parts of keys) that help skip levels in the tree or bring leaf information to the present level; population counts that help rapidly count the numbers of valid (stored) indexes in the tree or in any subexpanse (range of indexes); and type information about the next level in the tree, if any, to which the pointer points. Pointers may also provide information for verifying operation and data integrity, and correcting errors. State information may also be bundled with pointers so that the resultant rich pointers provide state information. In this case, the data structure not only provides a means to store and manipulate data, but includes facilities supporting the processes using the structure. The inclusion of this information allows the digital tree to be compressed in various ways that make it smaller, more cache-efficient, and faster to access and modify, even as the branch nodes are potentially no longer simply arrays of pointers to subsidiary nodes. This information also provides structure and redundancies that allow for faster access to and modification of the tree, as well as detection of data corruption.

BRIEF DESCRIPTION OF THE DRAWINGS

FIGS. 1, 1A–1E depict a digital tree which includes a comparison between prior art pointers and an informational pointer for skipping levels in a data structure;

FIG. 2 is generalized diagram of an informational pointer incorporating immediate storage of indexes;

FIG. 3 is a chart showing typical storage capabilities of informational pointers used to store immediate indexes;

FIGS. 4A–4D are diagrams of rich pointers used to store 3, 2 and 1 byte immediate indexes on a 32-bit system;

DETAILED DESCRIPTION

Figure 1B:
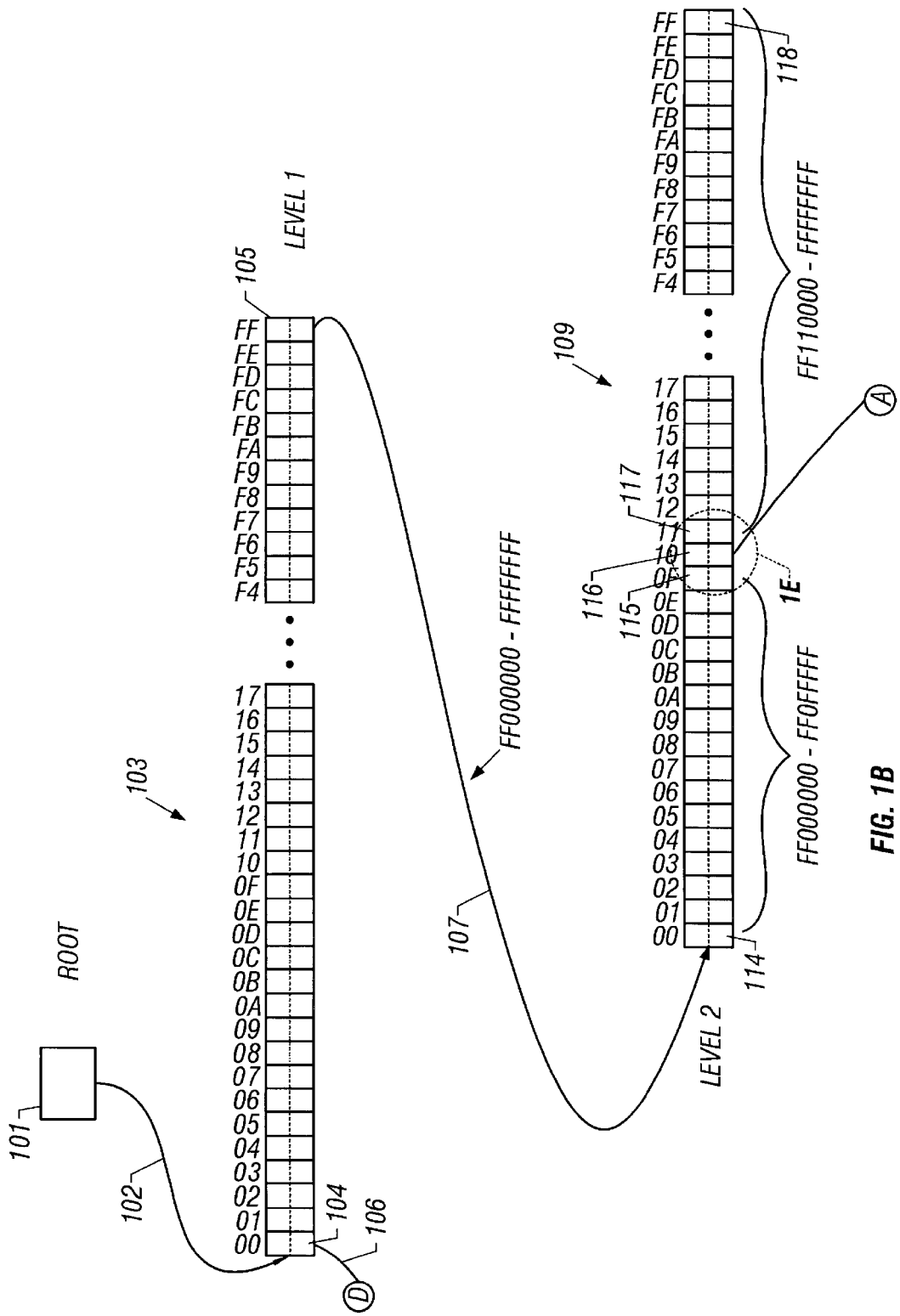
Figure 1C:
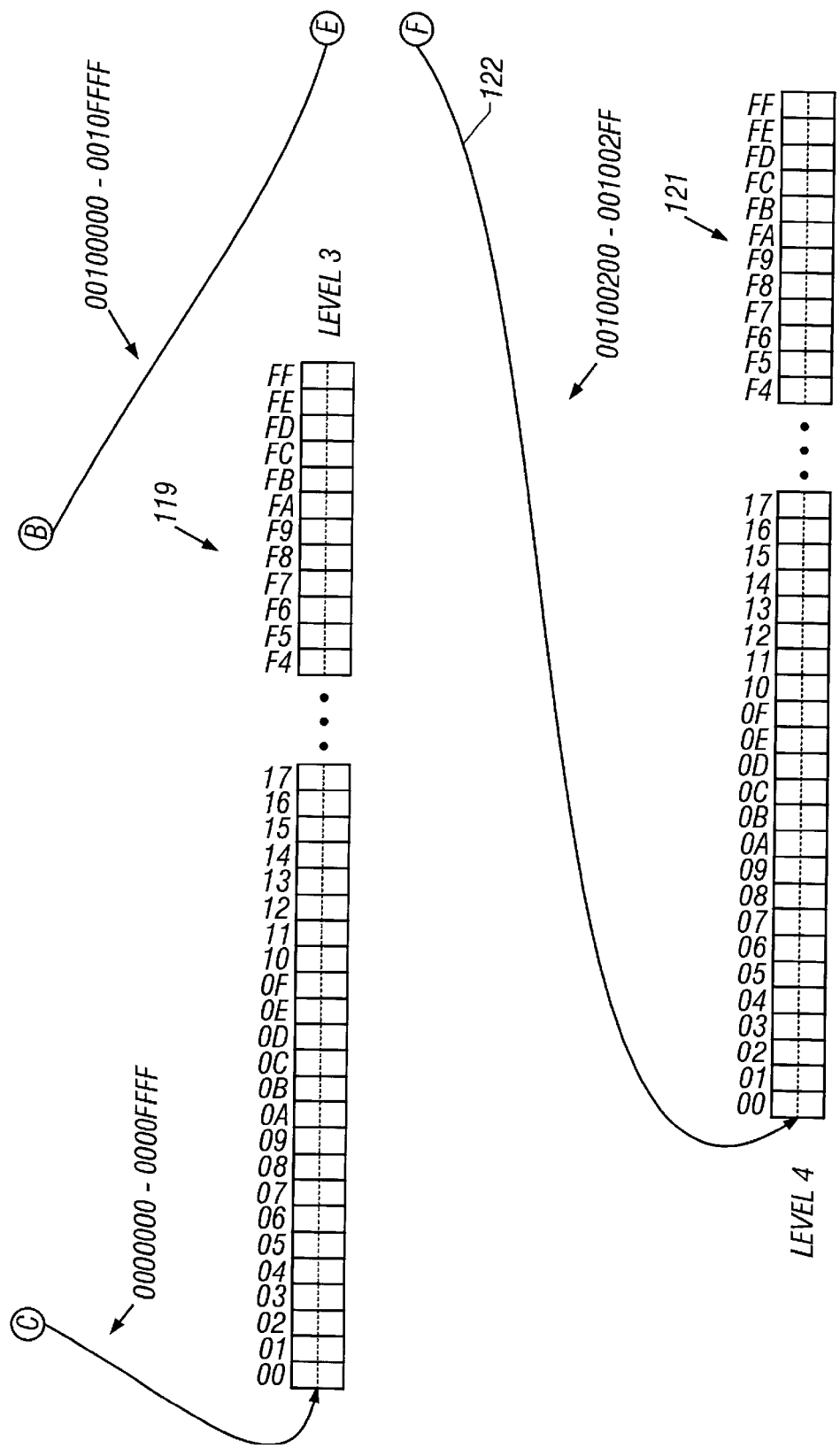
Figure 1D:
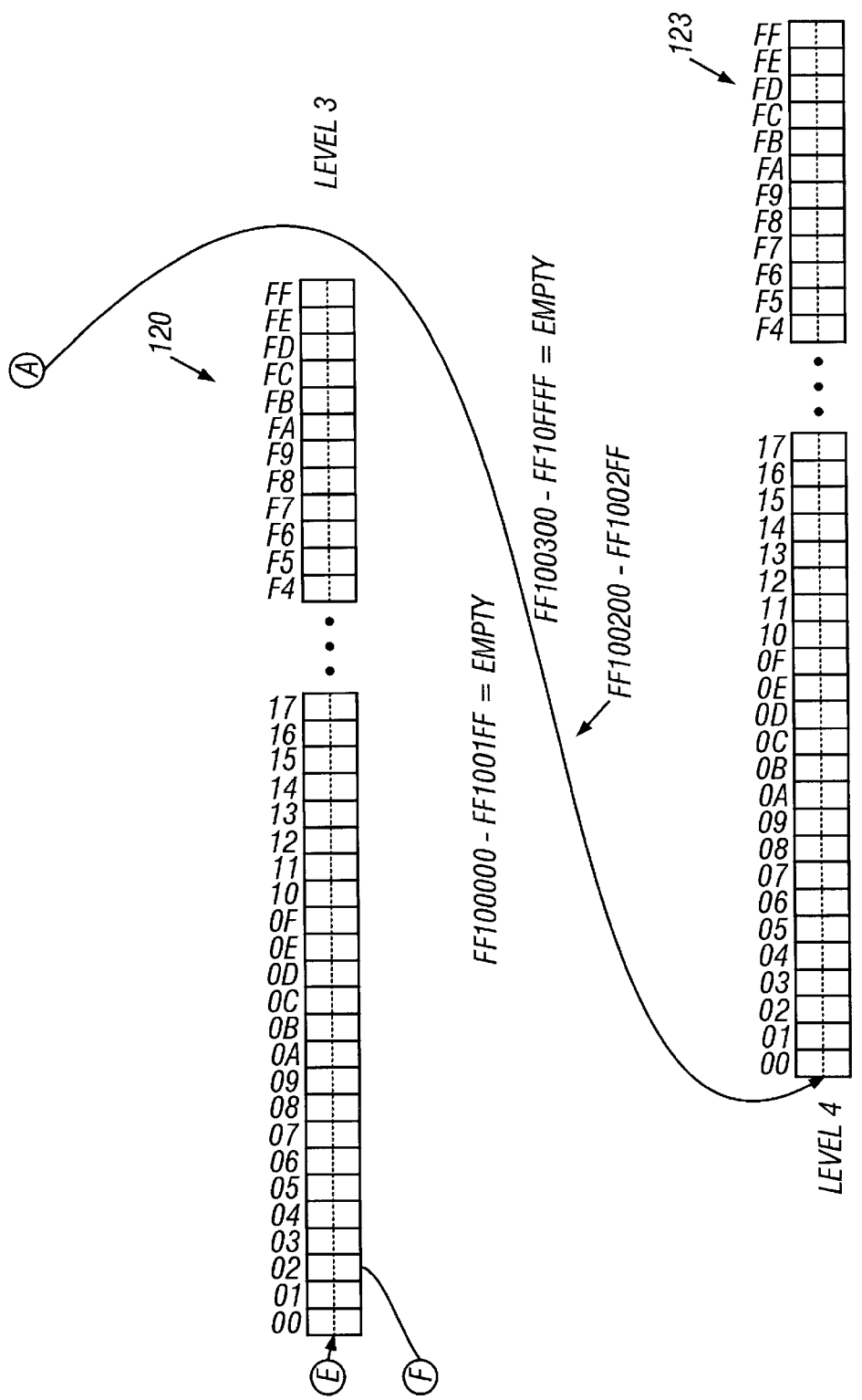
Figure 5A:
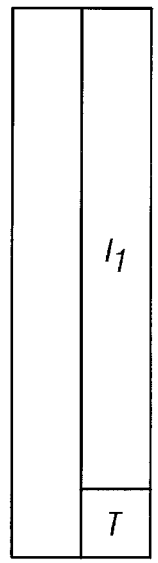
FIGS. 5A–5H are diagrams of rich pointers used to store 7-1 byte immediate indexes on a 64-bit system.
Figure 5B:
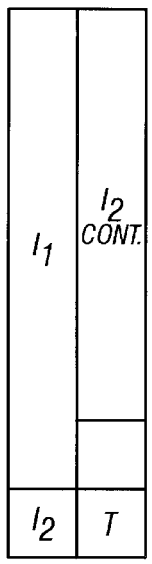
Figure 5C:
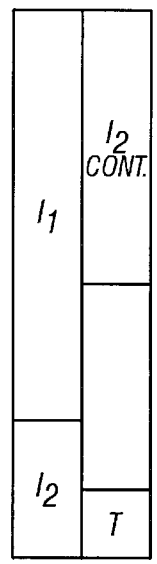
Figure 5D:
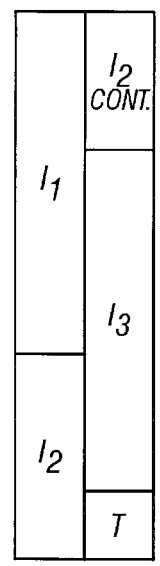
Figure 5E:
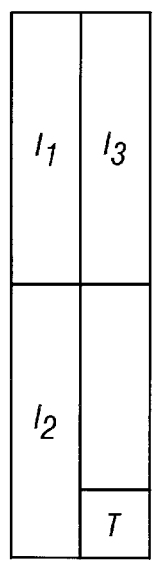
Figure 5F:
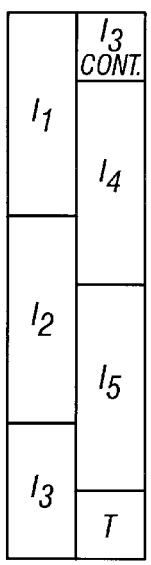
Figure 5G:
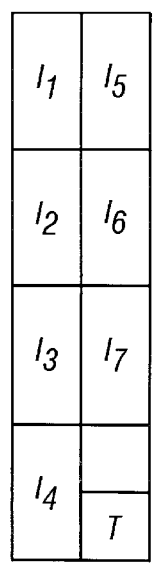
Figure 5H:
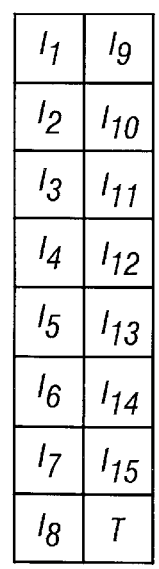

As previously described, typical digital trees exhibit several disadvantages. These disadvantages include memory allocated to null pointers associated with empty branches while exhibiting an increased number of memory references or indirections, and possibly cache line fills, as the size (i.e., "fanout") of the branches narrows to reduce the number of these null pointers. These disadvantages associated with digital trees have limited their use in prior computer applications.

The present invention combines the advantages of the digital tree with smarter approaches to handling both non-terminal nodes (branches) and terminal nodes (leaves) in the tree. These smarter approaches minimize both memory space and processing time, for both lookups, insertions and modifications of data stored in the data structure. Additionally, the present invention ensures the data structure remains efficient as indexes are added or deleted from the data structure. The approaches used by the present invention include forms of data compression and compaction and help reduce the memory required for the data structure, minimize the number of cache line fills required, and reduce access and retrieval times.

The present invention replaces the simple pointers typically implemented in digital trees with "rich" pointers (herein termed "informational pointers" and used interchangeably therewith) which associate additional information with the redirection or address information of the pointers. This additional information may be used by the data structure and/or by processes accessing the structure. The use of rich pointers within the digital tree permits various optimizations within the data structure. In a preferred embodiment of the invention each rich pointer in a digital tree branch includes multiple segments or portions, typically occupying two words (dependent upon the target platform). The rich pointer may contain an address (the actual pointer), index digits (parts of keys), population counts, type information concerning the next level to which the pointer "points" or is directed to within the tree, redundant data supporting error detection, state information, etc.

One type of a rich pointer is a narrow-expanse pointer. In particular, one type of data compression that may be used when an expanse is populated by a "dense cluster" of indexes that all have some leading bits in common is supported by a narrow-expanse pointer according to the present invention. The typical representation of the common bits through multiple digital tree branches (or redundant bits in leaves) can be replaced by uniquely representing (e.g., encoding) the common bits as part of or associated with the pointer to the branch or leaf. In a preferred embodiment of the present invention, this type of data compression is limited to common leading whole bytes. The common bits are stored in a rich pointer and the pointer type indicates the level of and the number of remaining undecoded digits in the next object. The remaining undecoded digits imply the number of levels skipped by the narrow pointer. The rich pointer is stored (i.e., associated) with the pointer to the next level, which has an expanse smaller than it would otherwise. Preferably, each subexpanse pointer contains a "decode" field that holds all index bytes decoded so far except for the first byte. Narrow pointers provide a method to skip levels within a digital tree which save memory used to store the indexes and reduces the number of memory references and cache fills required.

FIGS. 1A–1E depict the use of narrow-expanse pointers in a digital tree. (For the purposes of the present illustration, examples of the inventive data structure are given with reference to a 32-bit word size platform wherein indexes are single words (as opposed, e.g., to character strings of arbitrary length) although it is understood that the invention is not so limited and, to the contrary, encompasses other word sizes and configurations including, but not limited to 16, 32, 64 and 128-bit word sizes.) As used herein, the term "slot" refers to a record or group of cells of an array associated with, and/or including a pointer to a child node or, more generally, a subexpanse of indexes, together with any data associated with the pointer. Generally, the array is "indexed" so that each cell or "slot" is associated with an offset value corresponding to an ordinal value of the slot within the array. Thus, in further detail, root pointer node 101 is used for accessing the underlying data structure of the digital tree. Root pointer node 101 includes address information 102 diagrammatically shown as an arrow pointing to a first or "top" level node 103, in this illustration, a branch node. (Note, the terminology used herein labels the top node of a tree pointed to by the root as "level 1", children of the level 1 node are designated as "level 2" nodes, etc. According to this convention, the level of any branch or leaf node is equal to one more than the number of digits (bytes) decoded in the indexes stored above that node. It is further noted that this convention, while representative, is for purposes of the present explanation and other conventions may be adopted including, for example, designating leaf nodes as constituting a first level of the tree. In this latter case, a preferred embodiment of the invention, the level of any branch or leaf node is equal to the number of digits (bytes) remaining to decode in the indexes stored at or below that node.) First level node 103 includes slots or enhanced pointer arrays for up to 256 lower level nodes and represents the entire expanse of the data structure, i.e. indexes 00000000 through FFFFFFFF hex by implementing a 256-way branch. (Note that, although a preferred embodiment decodes 1 byte of the index at each branch, other divisions of the index may be used including, for example, decoding 4 bits to implement a 16-way branch at each level of the tree, etc.) First level node 103 includes first slot 104 (containing an adaptable object) which corresponds to expanse 00000000–00FFFFFF and last slot 105 which corresponds to a final expanse portion including indexes FF000000–FFFFFFFF. The pointer contained in the pointer field in slot 104 points to a first one of 256 of the next level subexpanses (level 2 in the digital tree) while the pointer in slot 105 points to the most significant upper ¹⁄₂₅₆th of level 2.

The first subexpanses of level 2 includes subsidiary node 108 in turn including an array of 256 pointers directed to lower level nodes 119 and 120. As shown, the expanse covered by node 108 (i.e., an index range of 00000000–00FFFFFF hex) is only sparsely populated by indexes falling within the subexpanse ranges covered by third level nodes 119 and 120 (i.e., 00000000–0000FFFF and 00100000–0010FFFF hex, respectively). Thus, while the pointers in slots 110 and 112 include valid redirection information to (i.e., address of) nodes 119 and 120, the remaining 254 pointers of node 108, including the pointer in slot 111 covering an uppermost expanse range of 00FF0000–00FFFFFF hex, are null pointers, i.e., have a special value reserved for pointers that are not directed to any target location or to empty nodes. Note that node 120 is similarly sparsely populated, with all indexes falling within a single subexpanse node 121 associated with a range of 00100200–001002FF hex and pointed to by the sole active pointer in node 120, that is pointer 122. Thus, not only does node 120 require the allocation of additional storage space for 256 pointers, but access to indexes referenced by it to leaf nodes requires two indirections and therefore two cache fills.

Thus, as pictured, slot 110 contains a pointer to a level 3 slot which corresponds to 000000–0000FFFF. Additionally, slot 112 contains a pointer which points to a separate subexpanse 120 of level 3 which correlates to 00100000–0010FFFF. Similarly, slots within level 3 may further point to a subexpanse at level 4. Operationally, level 4 of FIGS. 1A–1E is reached by consecutive decoding of one-byte portions of the index and traversing the tree in accordance with the decoded values. The first one byte (00) is used to identify slot 104 which contains the corresponding pointer to traverse the tree from level 1 to the corresponding portion of level 2 i.e., the node addressed by the pointer of slot 104. The next byte (10) is used to identify slot 112 which contains the corresponding pointer to traverse the tree from node 108 to subsidiary node 120 at level 3. The next byte (02) is used to identify slot 122 which contains the corresponding pointer to traverse the tree from node 120 of level 3 to node 121 of level 4. Once at level 4, the remaining byte is used to access the appropriate slot of node 121 to retrieve the data associated with the index value. As described, this process requires four separate memory references and potentially four different cache fills to identify the correct memory address which corresponds to the index.

If an expanse, or subexpanse, is sparsely populated with a small number of dense clusters of subsidiary indexes, a rich pointer may be used to encode the common bits of the populated subexpanse or indexes. Still referring to FIGS. 1A–1E, the upper 1/256 subexpanses of level 2 subsidiary node 109 contains a dense cluster of indexes which each lie within the range of FF100200–FF1002FF. The other portions of the upper 1/256 subexpanse, FF100000–FF1001FF and FF100300–FF10FFFF do not contain indexes. In this case, a rich pointer can be used to point directly to the level 4 portion of the subexpanse, skipping level 3 and eliminating the need for a memory reference or indirection to level 3. Specifically, the corresponding slot 116 contains a rich pointer node which includes an information data field 116A and a pointer node 116B to the next subexpanse or other structure for accessing the subsidiary indexes. The information data field 116A includes the common bytes (i.e., index portion) of the remaining indexes, 02, because the remaining indexes all fall within the range of FF10<u>02</u>00–FF10<u>02</u>FF.

In this case, the rich pointer is used to eliminate one of the memory references and possibly one cache fill. The first two bytes (FF) of the index are used to traverse from the level 1 of the tree to the appropriate portion of level 2. Once at the level 2 node the rich pointer is used to traverse from the level 2 node directly to the level 4 node.

The rich pointer structure encompasses at least two types of rich pointers or adaptable objects including a pointer type as described above and an immediate type. The immediate type supports immediate leaves or immediate indexes. That is, when the population of an expanse is relatively sparse, a rich pointer is used to store the indexes "immediately" within a digital tree branch, rather requiring traversal of the digital tree down to the lowest level to access the index. This format is akin to the "immediate" machine instruction format wherein an instruction specifies an immediate operand which immediately follows any displacement bytes. Thus, an immediate index or a small number of indexes are stored in the node, avoiding one or more redirections otherwise required to traverse the tree and arrive at some distant leaf node. Immediate indexes thereby provide a way of packing small populations (or small number of indexes) directly into a rich pointer structure instead of allocating more memory and requiring multiple memory references and possible cache fills to access the data.

A two word format of the preferred embodiment readily supports the inclusion of immediate indexes. Within the rich pointer, this is accomplished by storing index digits in the information data field. A rich pointer implemented in a 32-bit system may store anywhere from a single 3-byte immediate index up to seven 1-byte indexes, while a rich pointer in a 64-bit system may store up to 15 1-byte immediate indexes. The generalized structure of a rich pointer (also referred to as an adaptable object) supporting immediate indexes is shown in FIG. 2. The rich pointer includes one or more indexes "I", depending on the word-size of the platform and the size of the index, and an 8-bit Type field that also encodes the index size and the number of immediate indexes.

As mentioned, the number of immediate indexes stored will depend upon the word-size of the indexes, upper levels within the tree nearest the root requiring larger indexes, smaller indexes being found as the tree is traversed toward the leaves. Examples of numbers of immediate index values of various sizes accommodated by 32-bit and 64-bit machines according to a preferred embodiment are presented in FIG. 3 wherein indexes are mapped to valid/invalid indicators and have no associated values. FIGS. 4A–4D illustrate 3, 2 and 1-byte index sizes stored in an immediate rich pointer structure implemented on a 32-bit platform, while FIGS. 5A–5H illustrate index sizes of 7 through 1 byte implemented on a 64-bit machine. The structures of FIGS. 4A–4D and 5A–5H are also directed to an embodiment of the invention in which only the presence or absence of an index is indicated without any other value being associated with the indexes.

Figure 6C:
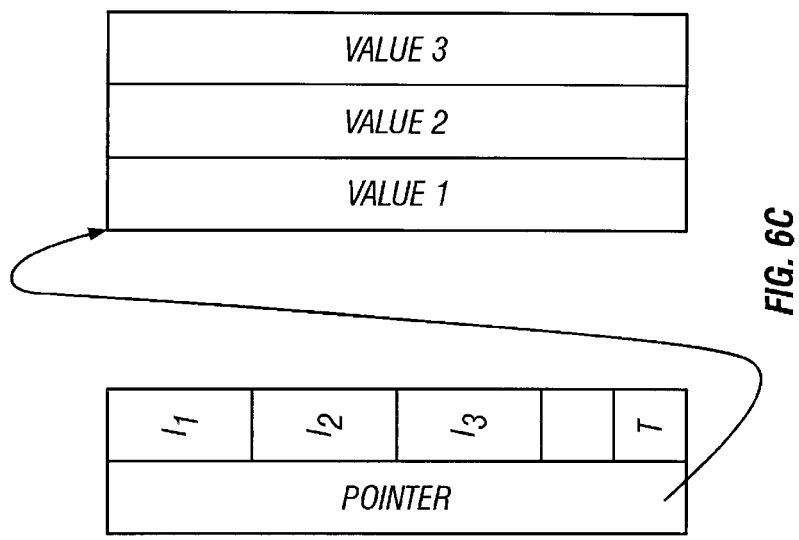
FIGS. 6A–6D are diagrams of rich pointers used to store immediate indexes and associated values on a 64-bit system.
Figure 6B:
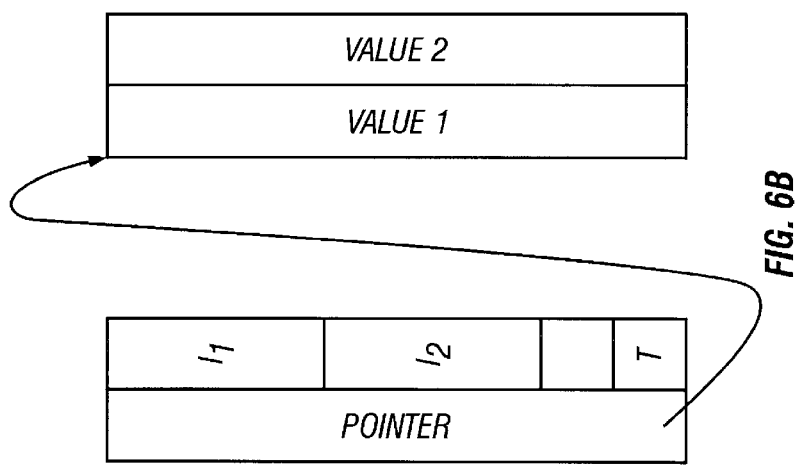
Figure 6A:
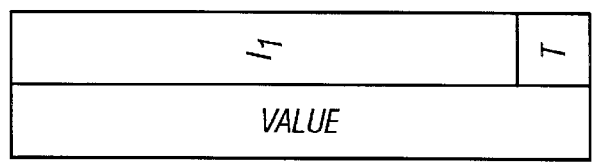
Figure 6D:
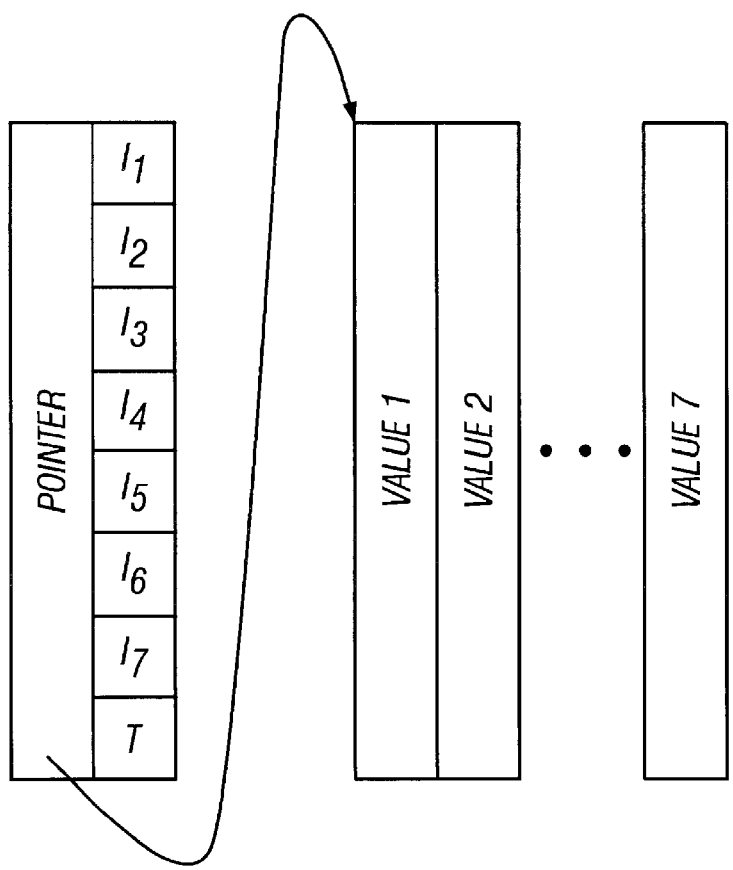
Figure 7:
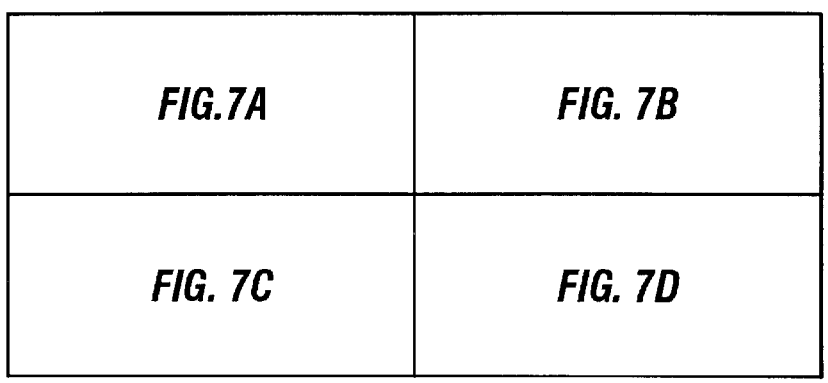
FIGS. 7, 7A–7E depict a digital tree which includes a comparison between indexes stored in leaf nodes and informational pointers used as immediate indexes.
Figure 7A:
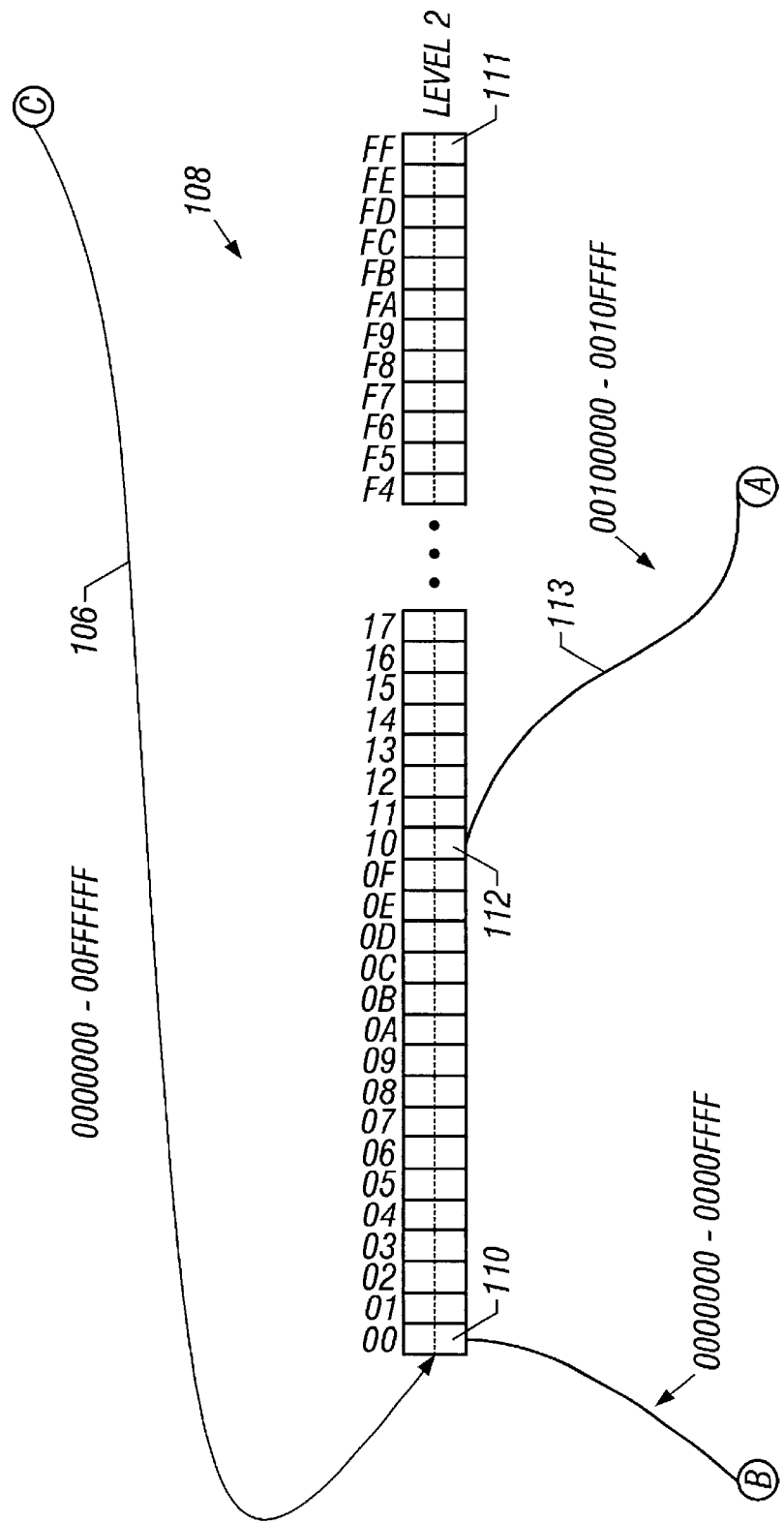
Figure 7B:
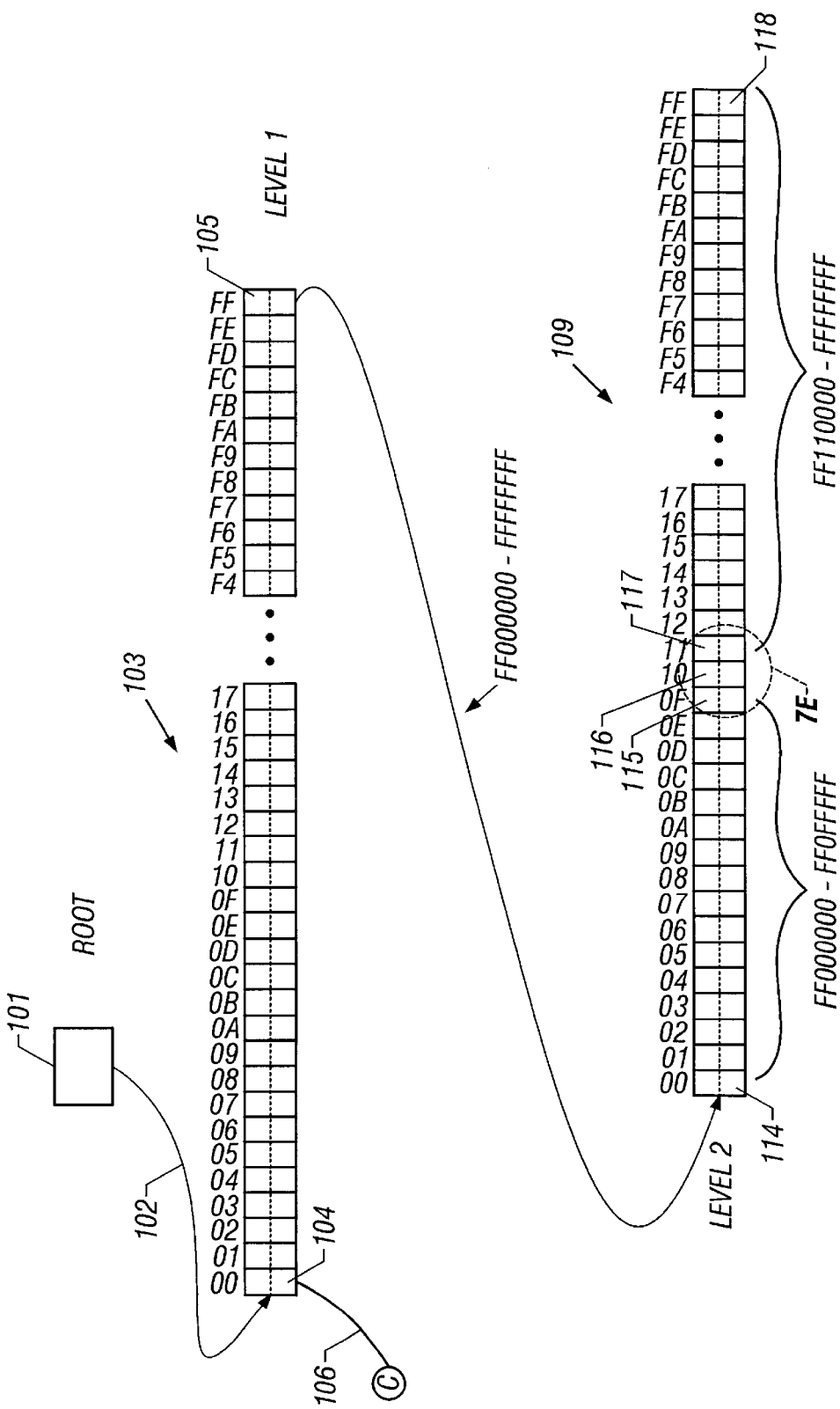
Figure 7C:
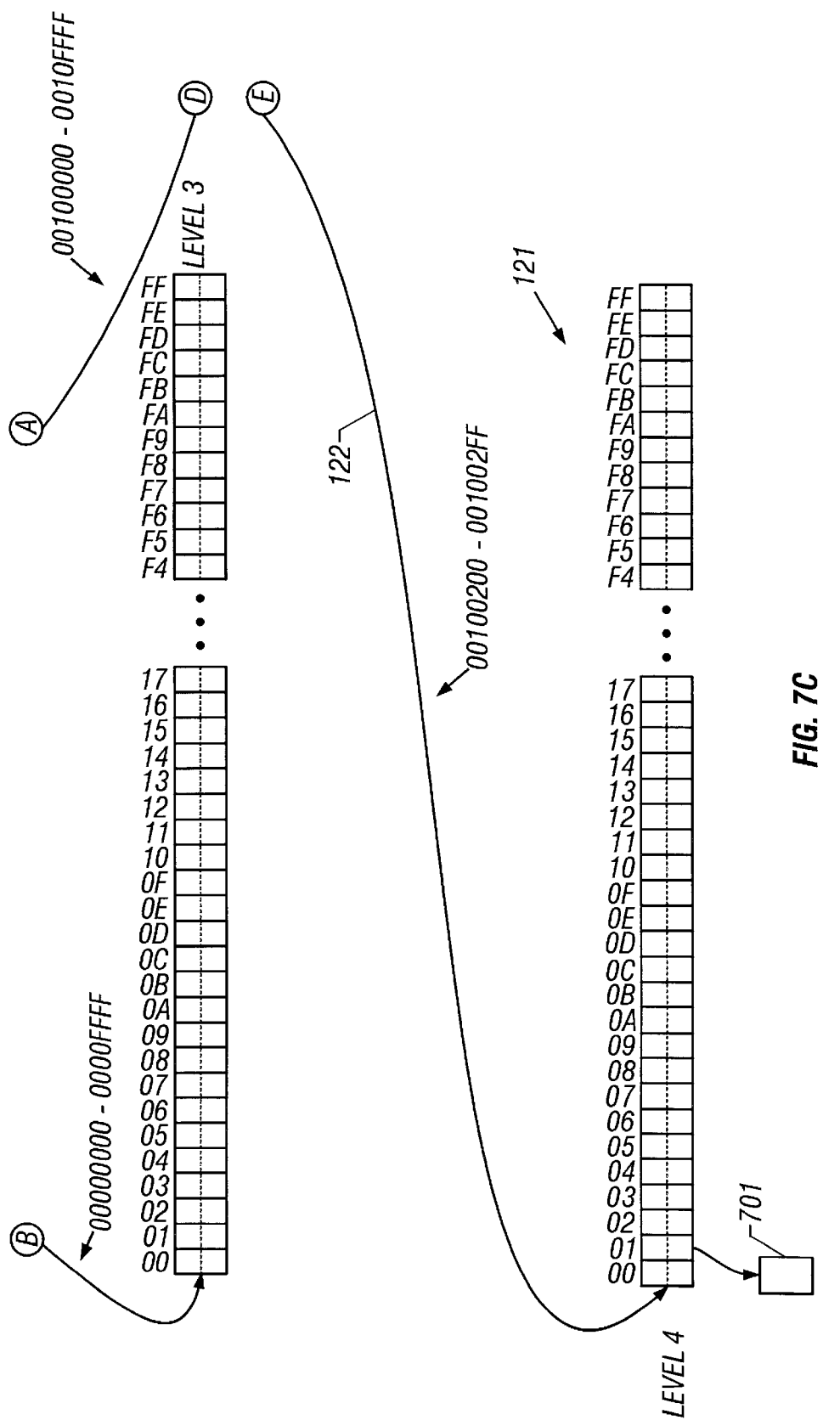
Figure 7D:
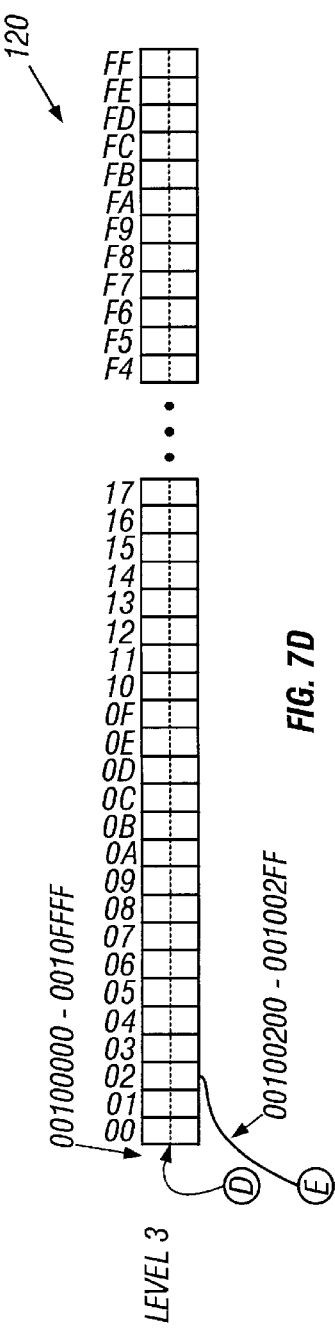
Figure 7E:
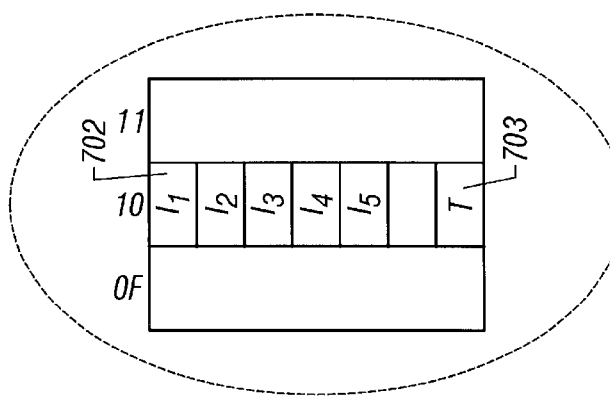

FIGS. 6A–6D illustrate another embodiment of the invention on a 64-bit machine wherein a value is associated with each index $I_n$. According to this embodiment, when a single immediate index $I_1$ of up to 7 bytes is stored in a rich pointer structure, a 64-bit value associated with the index is also stored as shown in FIG. 6A. However, if more than one immediate index is to be stored, such as when an index may be represented by 3-bytes, 2-bytes or 1-byte indexes (FIGS. 6B–6C, respectively), then the first 8-byte word of the rich pointer is instead used as a pointer to values associated with the respective multiple indexes. A similar configuration is used to store values associated with indexes when the invention is implemented on a 32-bit machine.

Immediate indexes are packed into rich pointers starting at the "first byte" (farthest from the type field), and possibly leaving some unused storage. An exception is present in a preferred embodiment wherein, if a single immediate index is stored, the indexes begin at the first byte of the second word to allow the first word to be a value area corresponding to the index, for those arrays that map an index to a value (see FIGS. 4A, 5A and 6A). The structure of an ordinary leaf and the indexes portion of a rich pointer containing an immediate index are identical once the starting address, index size, and population are known.

Thus, as described, an immediate index rich pointer structure may be thought of as including a small leaf. Such a structure is particularly helpful to represent a sparsely populated expanse where the indexes reside in the rich pointer itself.

FIGS. 7A–7E illustrate a comparison between typical pointers and a rich pointer which can be used to store immediate indexes. The indexes would typically be stored in the portion of level 4 node 121 in the corresponding array cell or "slot." By using a rich pointer as an immediate index, the indexes that would otherwise reside in a leaf node such as leaf node 701 are instead stored in the corresponding portion of a higher level node, e.g., level 2 node 109. For a 64 bit system, one or more indexes can be stored in slot 116 of level 2 node 109 in immediate index data field 702. As diagramed, slot 116 is logically divided into multiple subslots, each storing an immediate index. The use of rich pointers as immediate indexes avoids at least one memory reference and one or more cache line fills.

Another use of informational fields available with rich pointers is directed to storing state information associated with the object referenced by the pointer or otherwise describing and/or storing state information such as the state of the procedure accessing the structure. Thus, while the tree itself is not a state machine, when combined with a specified index to insert, delete, or retrieve, it may be used as input to the accessing process that allows the code to operate similar to a state machine. Each tree subexpanse pointer includes a "type" field (e.g., 8-bits) that encodes one of a large number (e.g., 256) of enumerated object types. Levels in the tree are directly encoded in the enumerations. Rich pointers allow rich pointer types which are a large number of very specific next-level object types. The tree traversal code can be thought of as a state machine whose inputs are the index/key to decode and the nodes of the tree. In a preferred embodiment, the state machine algorithm provides software which appears to be a single large switch, allowing the software to act as a collection of small, fast code chunks, each pre-optimized to perform one task well with minimum run-time computations. Since the tree level is encoded in each pointer type, the traversal code does not need to track the current tree level. Instead, this state information is stored within the nodes of the tree itself.

Rich pointers may also be used to detect errors in data, interpret and process data, etc., by providing information redundancy. That is, data characterizing the information stored as part of a rich pointer may be used to detect errors in the referenced data much as an error detection code might be used. This information may also be used to confirm, for example, position in a tree by encoding level or similar information in association with each pointer to form a rich pointer.

In particular, in practice it is not feasible or desirable to compress all unused bits out of a rich pointer. Machine instruction efficiency is partially dependent on word and byte boundaries. While the ratio of cache fill time to CPU instruction time is sufficiently high that cache efficiency is important, it is generally still low compared to other data compression methods that, for example, are directed to minimizing disk reads. (Cache-efficient programs must balance CPU time against "complete" data compression.) The result of "incomplete" compression is to provide and use some redundant data in rich pointers that allows tree traversal code to opportunistically, but very "cheaply," detect and report many types of data corruption in the tree itself, resulting either from tree management code defects or external accidents. In the preferred embodiment, cheaply detected corruptions may result in a void pointer return, while "expensive" detections result in assertion failure in debug code only and are ignored in production code. The unused bits of a rich pointer may be used to opportunistically determine various types of data corruption. As used herein, error detection data refers to any redundant data available to detect data corruption, whether or not that data is stored solely for the purpose of error detection or stored for other (functional) purposes but having a secondary use to detect errors.

For example, an error condition may be identified by checking to see that a pointer type matches the tree level. For example, it is inappropriate for certain objects such as a "Leaf1" object to appear at other than the lowest level of the tree furthest from the root. With reference to FIGS. 7A–7E, if the type field 703 contains an invalid value, such as 255, an invalid rich pointer type would be indicated and appropriate error processing performed.

Another check is performed for decode bytes in subexpanse pointers which include already-decoded index bytes that are not required as part of a narrow pointer, but nonetheless must match the path taken to this point in the tree. It is more efficient and simpler to store already-decoded index bytes this way then to somehow optimize to storing only required narrow-pointer bytes.

Rich pointers also allow computational efficiencies. In particular, when a single immediate index is stored in a rich pointer, there is room (e.g., in the Decode field) to store all but the first byte of the index, not just the remaining undecoded bytes. This allows faster traversal and modification. Like decode bytes, these redundant bytes must agree with the path traversed to the immediate index.

Rich pointers also support pointer portability. That is, when a narrow-expanse pointer indicates only the level of the subsidiary node, rather than the number of levels being skipped, it remains "portable". Like any rich pointer that "knows" about the object to which it refers but not about the object in which it resides, a portable narrow-expanse pointer allows easier branch insertion and deletion when an "outlier" index is inserted or deleted. (An outlier is an index that belongs under the full subexpanse of the slot occupied by the narrow-expanse pointer, but not under the present narrow expanse of that pointer.)

Figure 8:
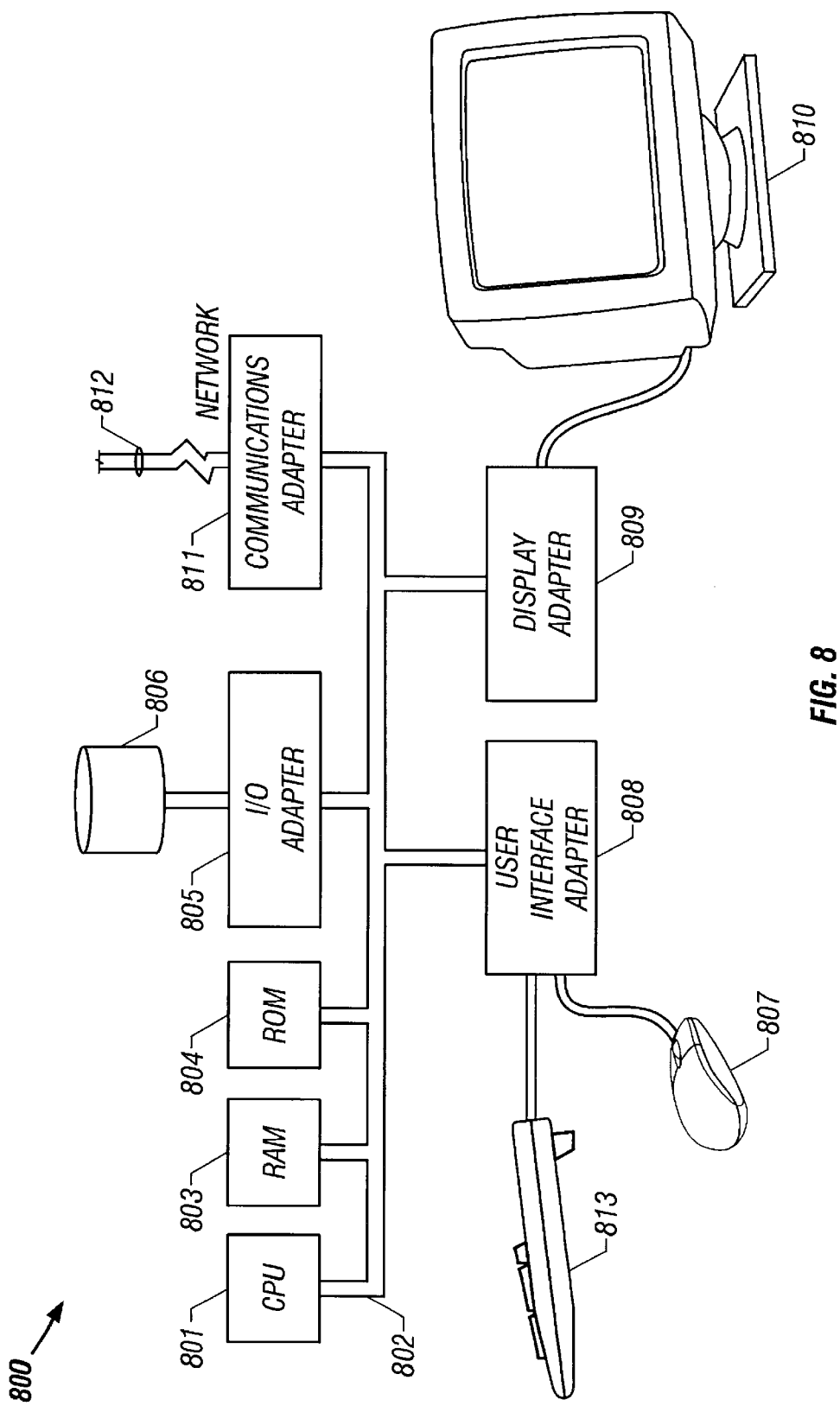
FIG. 8 is a block diagram of a computer system on which the present invention may be implemented.

FIG. 8 is a diagram of a computer system capable of supporting and running a memory storage program implementing and maintaining a data structure according to the invention. Thus, although the present invention is adaptable to a wide range of data structures, programming languages, operating systems and hardware platforms and systems, FIG. 8 illustrates one such computer system 800 comprising a platform suitable to support the present invention. Computer system 800 includes Central Processing Unit (CPU) 801 coupled to system bus 802. CPU 801 may be any general purpose CPU, such as an HP PA-8500 or Intel Pentium processor. However, the present invention is not restricted by the architecture of CPU 801 as long as CPU 801 supports the inventive operations as described herein, e.g., the use of pointers. System bus 802 is coupled to Random Access Memory (RAM) 803, which may be SRAM, DRAM or SDRAM. ROM 804 is also coupled to system bus 802, which may be PROM, EPROM, or EEPROM. RAM 803 and ROM 804 hold user and system data and programs as is well known in the art.

System bus 802 is also coupled to input/output (I/O) controller card 805, communications adapter card 811, user interface card 808, and display card 809. The I/O card 805 connects to storage devices 806, such as one or more of a hard drive, a CD drive, a floppy disk drive, a tape drive, to the computer system. Communications card 811 is adapted to couple computer system 800 to network 812, which may be one or more of a telephone network, a Local (LAN) and/or a Wide-Area (WAN) network, an Ethernet network, and/or the Internet network and can be wire line or wireless. User interface card 808 couples user input devices, such as keyboard 813 and pointing device 807, to computer system 800. Display card 809 is driven by CPU 801 to control display device 810.

While the invention has been described in connection with what is presently considered to be the preferred embodiment, it is to be understood that the invention is not limited to the disclosed embodiment, but, on the contrary, is intended to cover various modifications and equivalent arrangements included within the spirit and scope of the appended claims.

What is claimed is:

1. A data structure for storage of indexes in a computer memory, said data structure comprising:

a hierarchy of branch nodes ordered into a plurality of levels beginning with a top level branch, each of said branch nodes comprising an array of adaptable objects each associated with a subexpanse of said indexes mapped by a respective one of said branch nodes, said adaptable objects each including a type field indicating a type of said adaptable object, said type including a pointer type in which said adaptable object is configured to include a pointer to another node and an information data field configured to store information about said other node, and an immediate type in which at least one of said indexes is stored in said adaptable object.

2. The data structure according to claim 1 wherein said adaptable object is further configured to include a null pointer associated with an absence of one of said indexes in a subexpanse associated with said null pointer.

3. The data structure according to claim 1 wherein said information data field represents an index portion common to subsidiary ones of said indexes such that a subsidiary node is more than one level lower in the data structure than a branch node containing said information data field and does not encode a common portion of said subsidiary indexes.

4. The data structure according to claim 1 wherein a pointer field associated with one of said adaptable objects of said pointer type at one level of said data structure is directed to another of said branch nodes at another level of said data structure that is removed from said one level by at least two levels and said information data field of said adaptable object includes a portion of a plurality of said indexes common to all of said indexes in a subexpanse associated with said adaptable object.

5. The data structure according to claim 1 further comprising a plurality of leaf nodes associated with one or more of the indexes.

6. The data structure according to claim 5 wherein a pointer field associated with one of said adaptable objects of said pointer type at one level of said data structure is directed to one of said leaf nodes at another level of said data structure that is removed from said one level by at least two levels and said information data field of said adaptable object includes a portion of a plurality of said indexes common to all of said indexes in a subexpanse residing in said one leaf node.

7. The data structure according to claim 1 wherein at least a part of a said adaptable object comprises an immediate index data field configured to represent at least a portion of at least one subsidiary index, such that said subsidiary index is immediately present without further indirection through a pointer to a different location in said computer memory.

8. The data structure according to claim 1 wherein said information data field of said adaptable object is specific to each of said types.

9. The data structure according to claim 1 wherein said adaptable object includes data to be used in detecting an error condition within said data structure.

10. The data structure according to claim 9 wherein each of said adaptable objects comprises an integral number of contiguous data words subdivided into a plurality of fields, a portion of said contiguous data words remaining after said subdivision including said data to be used in detecting said error condition.

11. A method of storing indexes in a data structure, comprising the steps of:

defining a data structure including a hierarchy of branch nodes ordered into a plurality of levels beginning with a top level branch, each of said branch nodes comprising an array of adaptable objects each associated with a subexpanse of said indexes mapped by a respective one of said branch nodes, said adaptable objects each including a type field indicating a type of said adaptable object, said type including a pointer type in which said adaptable object is configured to include a pointer to another node and an information data field configured to store information about said other node, and an immediate type in which at least one of said indexes is stored in said adaptable object; and storing the indexes in the data structure.

12. The method according to claim 11 further comprising a step of configuring wherein said adaptable object to include a null pointer associated with an absence of one of said indexes in a subexpanse associated with said null pointer.

13. The method according to claim 11 further comprising a step of representing an index portion common to subsidiary ones of said indexes with said information data field such that a subsidiary node is more than one level lower in the data structure than a branch node containing said information data field and does not encode a common portion of said subsidiary indexes.

14. The method according to claim 11 further comprising a step of directing a pointer field associated with one of said adaptable objects of said pointer type at one level of said data structure to another of said branch nodes at another level of said data structure that is removed from said one level by at least two levels and storing in said information data field of said adaptable object a portion of a plurality of said indexes common to all of said indexes in a subexpanse associated with said adaptable object.

15. The method according to claim 11 further comprising a step of defining said data structure to include a plurality of leaf nodes associated with one or more of the indexes.

16. The method according to claim 15 wherein a pointer field associated with one of said adaptable objects of said pointer type at one level of said data structure is directed to one of said leaf nodes at another level of said data structure that is removed from said one level by at least two levels and said information data field of said adaptable object includes a portion of a plurality of said indexes common to all of said indexes in a subexpanse residing in said one leaf node.

17. The method of claim 11 further comprising a step of configuring at least a part of a said adaptable object to include an immediate index data field representing at least a portion of at least one subsidiary index, such that said subsidiary index is immediately present without further indirection through a pointer to a different location in said computer memory.

18. The method of claim 11 further comprising a step of configuring said information data field of said adaptable object to be specific to each of said types.

19. The method of claim 11 further comprising steps of storing error detection data in said adaptable objects and detecting an error condition within said data structure using said error detection data.

20. The method of claim 19 further comprising steps of subdividing each of said adaptable objects into a plurality of fields, identifying a remaining number of bits present in each of said adaptable objects after said step of subdividing, and allocating said remaining number of bits to said error detection data.

21. A computer memory for storing data for access by an application program being executed on a data processing system, comprising:

a data structure stored in said memory for storage of indexes, said data structure including a hierarchy of branch nodes ordered into a plurality of levels beginning with a top level branch, each of said branch nodes comprising an array of adaptable objects each associated with a subexpanse of said indexes mapped by a respective one of said branch nodes, said adaptable objects each including a type field indicating a type of said adaptable object, said type including a pointer type in which said adaptable object is configured to include a pointer to another node and an information data field configured to store information about said other node, and an immediate type in which at least one of said indexes is stored in said adaptable object.

22. A computer readable media having stored therein data for access by an application program being executed on a data processing system, comprising:

a data structure stored on said media for storage of indexes, said data structure including a hierarchy of branch nodes ordered into a plurality of levels beginning with a top level branch, each of said branch nodes comprising an array of adaptable objects each associated with a subexpanse of said indexes mapped by a respective one of said branch nodes, said adaptable objects each including a type field indicating a type of said adaptable object, said type including a pointer type in which said adaptable object is configured to include a pointer to another node and an information data field configured to store information about said other node, and an immediate type in which at least one of said indexes is stored in said adaptable object.

* * * * *